June 6, 1939. A. E. SCHUBERT 2,161,391
FILM WINDING MECHANISM
Filed Dec. 24, 1937  2 Sheets-Sheet 1
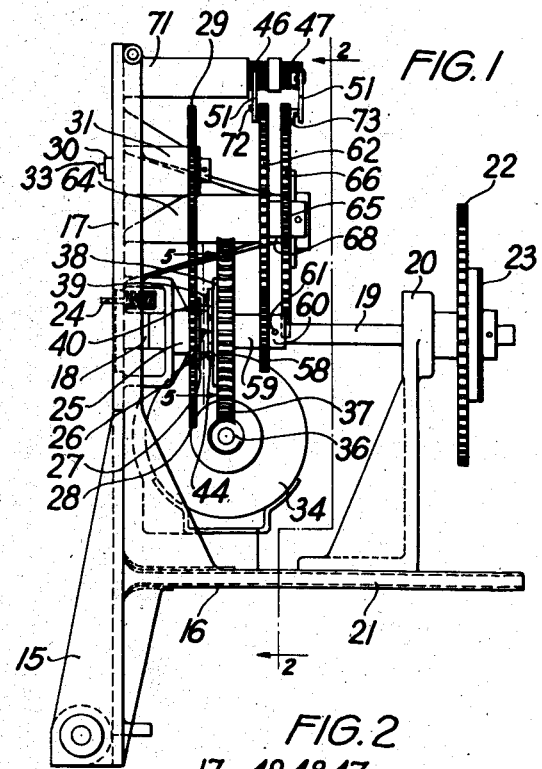
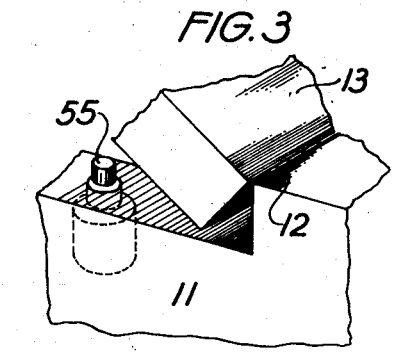
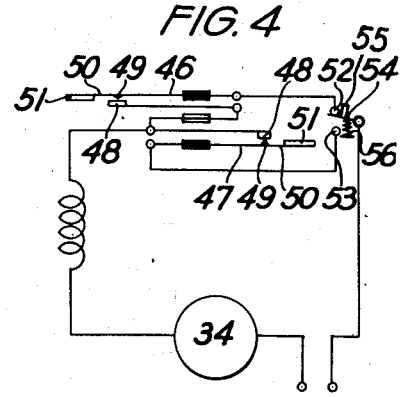
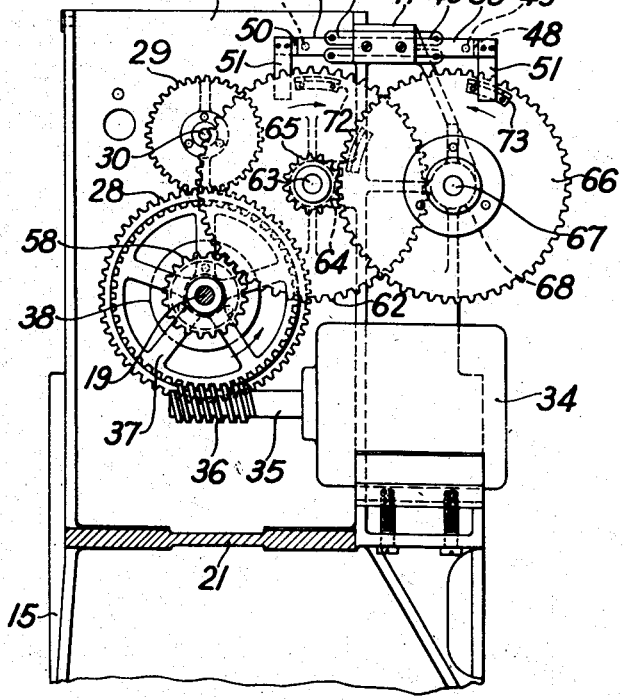
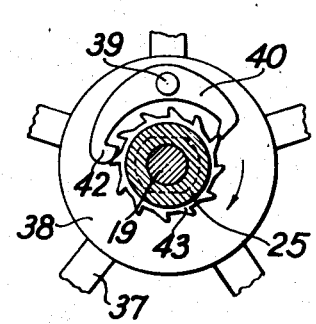
Alvin E. Schubert
INVENTOR
BY Newton M. Perrins
J. Griffin Little
ATTORNEYS

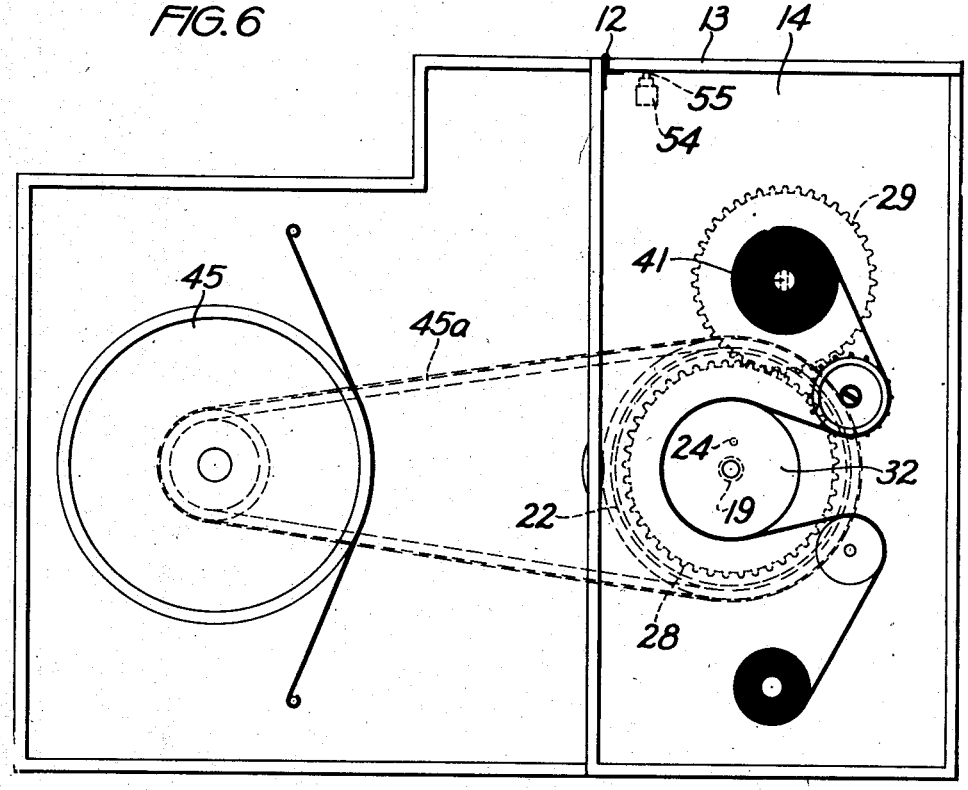

Patented June 6, 1939

2,161,391

UNITED STATES PATENT OFFICE 2,161,391

FILM WINDING MECHANISM

Alvin E. Schubert, Rochester, N. Y., assignor to Eastman Kodak Company, Rochester, N. Y., a corporation of New Jersey Application December 24, 1937, Serial No. 181,641

7 Claims. (Cl. 242—55)

The present invention relates to an apparatus for photographically recording documents, and more particularly to an automatic film winding mechanism for a camera of the above apparatus.

An object of the invention is the provision of a winding mechanism which automatically winds a predetermined length of film after the camera has been placed in position in the apparatus, and also prior to the removal of the camera therefrom, so as to protect the photographic images on the film strip.

Another object of the invention is the provision of a winding mechanism controlled by the closing and/or opening of the cover of the apparatus.

A further object of the invention is the provision of such a winding mechanism which is entirely automatic, and in which the sequence of steps is carried out without necessitating attention on the part of the operator.

A still further object of the invention is the provision of a winding mechanism of the kind described which may be readily and easily applied to existing machines.

Still another object of the invention is the provision of a winding mechanism which is not only automatic in operation, but is positive in its action, and highly effective.

To these and other ends, the invention resides in certain improvements and combinations of parts, all as will be hereinafter more fully described, the novel features being pointed out in the claims at the end of the specification.

In the drawings:

Fig. 1 is a front elevation view of the automatic film winding mechanism constructed in accordance with the preferred embodiment of the invention, as viewed from the right of Fig. 6;

Fig. 2 is a side elevation view taken substantially on the line 2—2 of Fig. 1, showing the arrangement of the film winding mechanism constructed in accordance with the present invention;

Fig. 3 is a perspective view of a portion of the cabinet in which the film winding mechanism is mounted, showing the arrangement by which the winding operation is initiated and controlled by the cover of the cabinet;

Fig. 4 is a diagrammatic layout of the electrical control for the film winding mechanism; and Fig. 5 is a partial vertical sectional view taken substantially on the line 5—5 of Fig. 1, showing the arrangement whereby the winding mechanism is operatively connected to and disconnected from the camera drive shaft.

Fig. 6 is a side elevation view of an apparatus for photographically recording documents, showing the relation thereto of a film winding apparatus constructed in accordance with the present invention.

Similar reference numerals throughout the various views indicate the same parts.

The present invention relates to a mechanism for automatically winding a definite length of photographic film onto the takeup reel of a camera, and more particularly to a film winding mechanism for an apparatus of the type shown and described in the patent to C. J. Hughey, Number 1,966,348, dated July 10, 1934. In a machine of this type, the camera is loaded and unloaded in daylight. For this reason, after the camera has been loaded and positioned within the cabinet, and before beginning the photographing of the documents, it is necessary to wind onto the takeup reel of the camera that portion of film exposed during the loading operation. It is also necessary at the completion of the photographing operation, to wind onto the takeup reel a number of turns of film before the camera is removed from the cabinet, so as to protect the photographic images from exposure to daylight. While the present embodiment relates to a winding mechanism for photographic film, the present invention is equally adapted to wind various types of materials in strip form. The term, "film," is, therefore, intended to be used in a generic sense to include all sheet materials in the form of a continuous web or strip.

In the present embodiment, this film winding is accomplished automatically, thus preventing any inadvertent fogging of the photographic images. To secure this result, a definite length of film is wound after the camera has been positioned in the cabinet, thus winding up the exposed portion of the film, and bringing a new or unexposed portion into exposing position to receive the photographic images of the documents to be photographed. When, however, the camera is to be removed, and prior to such removal, the portion of the film containing the last group of photographic images is wound onto the takeup reel, thus effectively protecting these images from exposure when the camera is removed. This is highly important, as the documents photographed are not usually available for rephotographing. The opening and closing of the cover of the cabinet is utilized for initiating the winding operation, as will hereinafter be more fully described.

For example, after the loaded camera has been placed in the cabinet, the closing of the cabinet cover closes an electrical switch to start a winding motor which rotates the film winding shaft approximately two and one-half (2½) turns to bring the unexposed film into exposing position. After the desired documents have been photographed and the camera is to be removed, the cover of the cabinet is opened. This opening of the cover, moves an electric switch to again start the winding motor which now rotates the winding shaft approximately eight (8) turns, thus protecting the last images on the film strip. All the operator has to do is to open and close the cover, the winding operation being performed automatically, thus assuring that images of the various documents photographed will be effectively protected against fogging.

The camera housing or cabinet 11 is provided with a cover 13 which is connected by a hinge 12 to the cabinet, as shown in Fig. 3. When the cover is raised, access may be had to the interior of the cabinet to place or remove the camera, not shown. When the cover is closed, a light-tight compartment 14 is provided for the camera. The latter is supported on a bracket 15 depending from and preferably formed integral with an L-shaped support, generally indicated by the numeral 16 and secured, in any suitable well-known manner, within the cabinet 11. The vertical leg 17 of the support 16 is provided with a bearing 18 in which one end of the drive shaft 19 is journaled. The other end of the shaft 19 is supported in a pedestal bearing 20 extending upwardly from the horizontal leg 21 of the L-shaped support 16. The right end of the shaft 19 has mounted thereon a sprocket 22 which may be connected to and operated in timed relation with a document conveying drum 45 by means of a suitable drive such, for example, as a chain 45a, as illustrated in the above-mentioned patent to Hughey. A one-way clutch, broadly designated at 23, operatively connects the sprocket 22 to the shaft 19 so that the latter may be driven when the document conveying drum is rotated to feed the document through the photographic field of the camera.

The left end of the drive shaft 19, as viewed in Fig. 1, is provided with a spring press pin 24 arranged to engage and drive the film advancing roll, 32, upon rotation of the drive shaft. A sleeve 25 is secured, by means of a pin 26, to the shaft 19, and is formed with a flange 27 to which is fastened, in any suitable manner, a gear 28 which meshes with a gear 29 on a shaft 30, the end of which is formed with a key 33 which engages a cooperating portion in the takeup spindle 41. The latter shaft is journaled in a bearing 31 formed on the vertical leg 17 of the support 16, and is operatively connected to the takeup spindle on the camera. Thus when the drive shaft 19 is rotated, the film advancing roll 32 and the takeup spindle 41 will be simultaneously driven to advance the film strip through the camera to wind the strip onto the takeup reel positioned on the takeup spindle.

The present invention provides an auxiliary means for rotating the drive shaft 19 so as to wind the film onto the takeup reel after the camera is positioned in the compartment 14 of the cabinet 11 and prior to the removal therefrom for the reasons pointed out above. This auxiliary means comprises, in its present embodiment, an electric winding motor 34, of the series type, which is suitably mounted on the horizontal leg 21 of the support 16, as clearly illustrated in Figs. 1 and 2. The shaft 35 of the motor carries a worm 36 which meshes with a worm gear 37 loosely mounted on the shaft 19. The left face of the worm gear 37, as viewed in Fig. 1, has secured thereto a plate 38 on which is pivoted at 39 a pawl 40 of the shape best shown in Fig. 5. When the gear 37 is driven by the motor 34, the gear and its plate 38 rotate in a clockwise direction, as viewed in Fig. 5. This rotation brings the nose 42 of the pawl 40 into engagement with one of the teeth 43 of a ratchet 44 mounted on the end of the sleeve 25, in a manner clearly illustrated in Fig. 5. As the sleeve 25 is pinned to the shaft 19, the pawl and ratchet thus operatively connect the gear 37 to the drive shaft so that the latter may be operated upon rotation of the motor 34. When the shaft 19 is thus driven, the sprocket 22 is disconnected by reason of the one-way clutch 23, mentioned above. When, on the other hand, the sprocket 22 is driven, the one-way clutch 23 connects the sprocket to the drive shaft 19 and drives the latter.

It has been found that if the drive shaft 19 is rotated approximately two and one-half (2½) turns, the film which is exposed during the loading operation is moved sufficiently to bring the unexposed portion of the film strip into exposing position. On the other hand, substantially eight (8) turns of the shaft 19 are necessary to sufficiently protect the image bearing portion of the film strip prior to the removal of the camera from the cabinet. The present invention provides an arrangement by which the raising or closing of the cover 13 will close the circuit of the winding motor 34 to wind the required amount of film, and when the film has thus been wound, the motor circuit is automatically opened to stop the motor.

Fig. 4 shows a diagrammatic layout of the electrical circuit of the motor 34. A pair of switches, generally indicated by the numerals 46 and 47, are arranged in parallel with the motor circuit. Each of these switches comprises a stationary contact 48, and a movable contact 49 mounted on a breaker arm 50 the free end of which carries an insulating block 51, the purpose of which will be later described. It is apparent that if either of the switches 46 or 47 is closed and connected into the motor circuit, the motor 34 will operate to drive the shaft 19 and thus wind the film onto the takeup reel of the camera. The breaker arms 50 of the switches 46 and 47 are electrically connected to contacts 52 and 53 respectively, see Fig. 4. A selector switch 54 is arranged in series with the motor 34 and may be selectively moved to engage either of the contacts 52 or 53, as is apparent upon inspection of Fig. 4. By means of this arrangement either of the switches 46 or 47 may be connected into the motor circuit. It is obvious, of course, that when one of the switches 46 or 47 is connected, the other switch is disconnected through the contacts 52 or 53.

The switch 54 is preferably in the form of a button or plunger 55 which is mounted in the side wall of the cabinet 11 and projects slightly above the top thereof and in the path of the cover 13, as clearly illustrated in Fig. 3. A spring 56 tends to move the switch 54 upwardly so that when the cover is lifted this switch is moved to engage the contact 52, and thus connect the switch 46 with the motor circuit. When, on the other hand, the cover is closed, the latter engages the plunger 55 to move the latter downwardly so that the switch 54 will now engage the contact 53 to connect the switch 47 into the circuit of the motor 34. It is apparent, therefore, that the closing or opening of the cover 13 will start the motor 34 and thus initiate the winding operation. It remains now to provide means for opening the motor circuit after the desired length of film is wound. This opening of the motor circuit may, obviously, be done manually, but it is preferred to accomplish this automatically thus not only relieving the operator of this responsibility, but also assuring that the proper amount of film will be wound to sufficiently protect the photographic images on the film strip.

To secure this result, the present invention provides an arrangement for moving the breaker arms 50, thus opening the motor circuit after the proper amount of film has been wound. The particular breaker arm which is thus moved is, of course, determined by which switch 46 or 47 is connected into the motor circuit. For example, when the camera is loaded and placed in the cabinet 11, the cover 13 is closed thus moving the switch 54 into engagement with the contact 53 to connect the switch 47 into the motor circuit. After the drive shaft has been rotated approximately two and one-half (2½) turns, the breaker arm 50 of the switch 47 is moved to open or break the contacts 48 and 49 and thus shut down the motor, as will be later described. The machine is now operated to photograph the desired documents, the motor 34 remaining stationary during this operation. When, however, the photographing has been completed and the camera is to be removed, the cover 13 is lifted. The spring 56 then moves the switch 54 upwardly into engagement with the contact 52 to now connect the switch 46 into the motor circuit. After the drive shaft has been rotated approximately eight (8) turns to effectively wind the strip onto the takeup reel, the breaker arm 50 of the switch 46 is now moved to break the contacts 48 and 49 to again stop the motor 34.

In the preferred embodiment of the invention, the motor 34 not only rotates the drive shaft 19 to wind the film, but also controls the means for moving the breaker arms 50 to open the switches 46 and 47. In order to accomplish this result, a gear 58 is loosely mounted on the shaft 19 and is secured to the gear 37 in any well-known manner, a spacer sleeve 59 being interposed between the gears 37 and 58, as clearly illustrated in Fig. 1. The gears 37 and 58 and the sleeve 59 are all held in axial position on the shaft 19 between the sleeve 25 and a sleeve 60 pinned to the shaft by means of a pin 61.

The gear 58 meshes with a gear 62 mounted on a shaft 63 journalled in a bearing 64 extending outwardly from the vertical legs 17 of the support 16, as best shown in Fig. 1. The shaft 63 also carries a smaller gear 65 which meshes with a gear 66 secured to a shaft 67 journalled in the bearing 68 which also extends outwardly from the vertical leg 17. The worm 36 and gears 37, 58, 62, 65, and 66 thus constitute a gear train which is driven from and controlled by the winding motor 34, as is apparent from an inspection of Figs. 1 and 2. The gears 62 and 66 are the same pitch diameter, and the ratio of the revolutions of the shafts 63 and 67 is approximately 4 to 1, so that the gear 62 will make substantially four revolutions to each revolution of the gear 66.

The switches 46 and 47 are mounted on the end of an arm 71 which projects laterally from the leg 17 of the support 16, as clearly shown in Fig. 1. These switches are so positioned on the arm 71 that the insulating blocks 51 and the breaker arms 50 extend downwardly adjacent the sides of the gears 62 and 66, as clearly shown in Fig. 1. The gears 62 has mounted thereon a cam 72 which is arranged to engage the block 51 on the switch 47 to open the latter. The gear 66 is also provided with a similar cam 73 which is arranged to engage the other block 51 to open the switch 46. As these cams engage these insulating blocks 51, the breaker arms 50 are moved to thus separate the contacts 48 and 49 to open the switches 46 and 47, to stop the winding motor 34, as will be readily apparent to those in the art. However, as pointed out above, only one of the switches 46 or 47 is connected at one time in the motor circuit, by reason of the position of the selector switch 54. Furthermore, as the gear 62 makes four revolutions to one revolution of the gear 66, the former has made one revolution while the latter has made only a quarter of a revolution.

When the loaded camera is placed in the compartment 14, the cams 72 and 73 are in the position shown in Fig. 2, the cam 72 being just beyond the insulating block 51 of the switch 47 so as to close the latter. Now when the cover 13 is closed, the selector switch 54 is moved to engage the contact 53 to connect the switch 47 in the motor circuit, and to rotate the gear train in the direction indicated in Fig. 2. The motor is now operated to rotate the shaft 19 to wind the film. After approximately 2½ revolutions of the drive shaft have been completed, the cam 72 on the gear 62 now engages the breaker block 51 on the switch 47 to open the latter and thus stop the winding motor 34. When the gear 62 has been rotated substantially one revolution, the gear 66 has moved approximately one-quarter of a revolution to bring the cam 73 thereof to the position shown dotted in Fig. 2. The various documents are now photographed. During the photographing operation, the shaft 19 is driven by means of the sprocket 22 and the one-way clutch 23, as above described. When, however, the photographic operation has been completed, the cover 13 is then lifted to permit the removal of the camera. This lifting of the cover automatically moves the switch 54, under the action of the spring 56, into engagement with the contact 52 to connect the switch 46 into the motor circuit. The motor now operates to drive the shaft 19 to wind the film onto the takeup reel. When the shaft has made approximately 8 revolutions, the gear 66 has moved substantially three-quarters (¾) of a revolution to bring the cam 73 thereon into engagement with the block 51 of the switch 46 to open the latter and thus shut down the winding motor 34. By means of the arrangement, the opening and closing of the cover 13 automatically closes the motor circuit to one of the switches 46 or 47 and thus initiate the winding operation. When, however, the proper amount of film has been wound onto the takeup reel, one of the cams 72 or 73 opens the switches 46 or 47 to automatically stop the winding motor.

It is thus apparent from the above description that the present invention provides means for automatically winding a definite length of film after the camera has been placed in and before it is removed from the cabinet 11. It is also apparent that this winding operation is automatic upon the closing and opening of the cabinet cover. Such a winding mechanism may be readily and easily applied to existing machines.

While one embodiment of the invention has been disclosed, it is to be understood that the inventive idea may be carried out in a number of ways. This application is, therefore, not to be limited to the precise details described but is intended to cover all variations and modifications thereof falling within the spirit of the invention and the scope of the appended claims.

I claim:

1. In an automatic film winding mechanism, the combination with winding means on which a strip of film may be wound, of means including an electric motor for driving said winding means, a pair of switches arranged in parallel relation in the circuit of said motor, means operated by said driving means and in timed relation thereto to open one of said switches to stop said driving means after a predetermined length of film has been wound onto said winding means, a selector switch connected in series with said one switch, means for automatically disconnecting said selector switch from said one switch and connecting it to said other switch so as to again close said motor circuit so that said driving means may drive said winding means, and a rotary cam operated by said driving means in timed relation to said first mentioned means to open said other switch when a predetermined length of film has been again wound onto said winding means.

2. In an automatic film winding mechanism, the combination with winding means on which a strip of film is adapted to be wound, a winding shaft, means operatively connecting said winding shaft to said winding means, means for driving said shaft, of auxiliary means including an electric motor for driving said shaft independently of said driving means, an electric switch adapted to be connected into the circuit of said motor, and means including a cam operated by said auxiliary means to open said switch after a predetermined length of film has been wound onto said winding means.

3. In an automatic film winding mechanism, the combination with winding means on which a strip of film is adapted to be wound, a winding shaft, means operatively connecting said winding shaft to said winding means, means for driving said shaft, of auxiliary means including an electric motor for driving said shaft independently of said driving means, a pair of electrical switches arranged in parallel relation in the circuit of said motor, a selector switch for connecting one of said pair of switches in said circuit so that said motor may drive said winding shaft, a member operated by and controlled in timed relation to said auxiliary driving means, and a switch opening portion on said member for opening said switch to stop said motor after a definite length of film has been wound onto said winding means.

4. In an automatic film winding mechanism, the combination with winding means on which a strip of film is adapted to be wound, a winding shaft, means operatively connecting said winding shaft to said winding means, means for driving said shaft, of auxiliary means including an electric motor for driving said shaft independently of said driving means, a pair of electrical switches arranged in parallel relation in the circuit of said motor, a selector switch, means for selectively connecting said selector switch to one of said pair of switches to close said motor circuit, means for operatively connecting said motor to said drive shaft so as to drive the latter, a gear train driven by said motor, one gear of said train having a cam thereon adapted to engage and open said one switch to stop said motor after a definite length of film has been wound onto said winding means, means for disconnecting said selector switch from said one switch and connecting it to the other of said pair of switches to again close the circuit of said motor so that the latter may drive said drive shaft, and a cam on another gear of said gear train arranged to engage and open said other switch to again stop said motor after a predetermined length of film has been wound onto said winding means.

5. In an automatic film winding mechanism, the combination with winding means on which a strip of film is adapted to be wound, a winding shaft, means operatively connecting said winding shaft to said winding means, means for driving said shaft, of auxiliary means including an electric motor for driving said shaft independently of said driving means, a pair of electrical switches arranged in parallel relation in the circuit of said motor, a selector switch for connecting one of said pair of switches in said circuit so that said motor may drive said winding shaft, a gear loosely mounted on said drive shaft and operatively connected to and driven by said motor, means for connecting said gear to said shaft so that said motor may drive the latter, a gear train operatively connected to and driven by said gear, a cam on one of the gears of said gear train arranged to engage and open said one switch to stop said motor after a definite length of film has been wound onto said winding means, means for connecting said selector switch to the other of said pair of switches to again close said motor circuit, and a cam on another gear of said train arranged to engage and open said other switch to again stop said motor after a length of film different from said definite length has been wound onto said winding means.

6. In an automatic film winding mechanism, the combination with winding means on which a strip of film is adapted to be wound, a winding shaft, means operatively connecting said shaft to said winding means, means for driving said shaft, of a worm gear loosely mounted on said shaft, an electric motor, a worm mounted on the shaft of said motor and engaging said worm gear to rotate the latter, a ratchet on said driving shaft, a pawl on said worm gear adapted to engage said ratchet to operatively connect said worm gear to said drive shaft, a one-way clutch mounted on said driving shaft to disconnect said driving means when said worm gear is connected to said driving shaft, a pair of electrical switches arranged in parallel relation in the electrical circuit of said motor, a selector switch for connecting one of said pair of switches into said motor circuit, a pair of gears driven by said worm gear, a cam on one of said gears arranged to engage said one switch to open the latter and to stop said motor when a definite length of film has been wound onto said winding means, means for automatically moving said selector switch to connect the latter to said other of said pair of switches to again close said motor circuit, and a second cam on the other of said pair of gears, said second cam being arranged to engage and open the other of said pair of switches when a predetermined length of film is wound onto said winding means.

7. In an automatic film winding mechanism, the combination with a cabinet, a cover hingedly secured to said cabinet, winding means positioned in and supported by said cabinet and adapted to wind a film strip thereon, a winding shaft supported by said cabinet, means operatively connecting said shaft and said winding means, means for driving said shaft, of a worm gear loosely mounted on said shaft, an electric motor, a worm mounted on the motor shaft and engaging said worm gear to drive the latter, a ratchet on said driving shaft, a pawl on said worm gear adapted to engage said ratchet to connect said worm gear to said winding shaft, a one-way clutch for disconnecting said driving means when said worm gear is connected to said winding shaft, a pair of electrical switches arranged in parallel relation in the electrical circuit of said motor, a selector switch engageable by said cover when the latter is closed to connect said selector switch to one of said pair of switches, a pair of gears operatively connected to and driven in timed relation to said worm gear, a cam on one of said gears arranged to engage and open said one switch after a predetermined length of film has been wound onto said winding means, said selector switch being automatically connected to the other of said pair of switches when said cover is opened, and a second cam on the other of said pair of gears arranged to engage and open the other of said pair of switches after a different amount of said film has been wound onto said winding means.

ALVIN E. SCHUBERT.